June 12, 1923.
H. L. BLOOD
1,458,613
PLANER AND SYSTEM OF MOTOR CONTROL THEREFOR
Filed Jan. 31, 1920    4 Sheets-Sheet 1
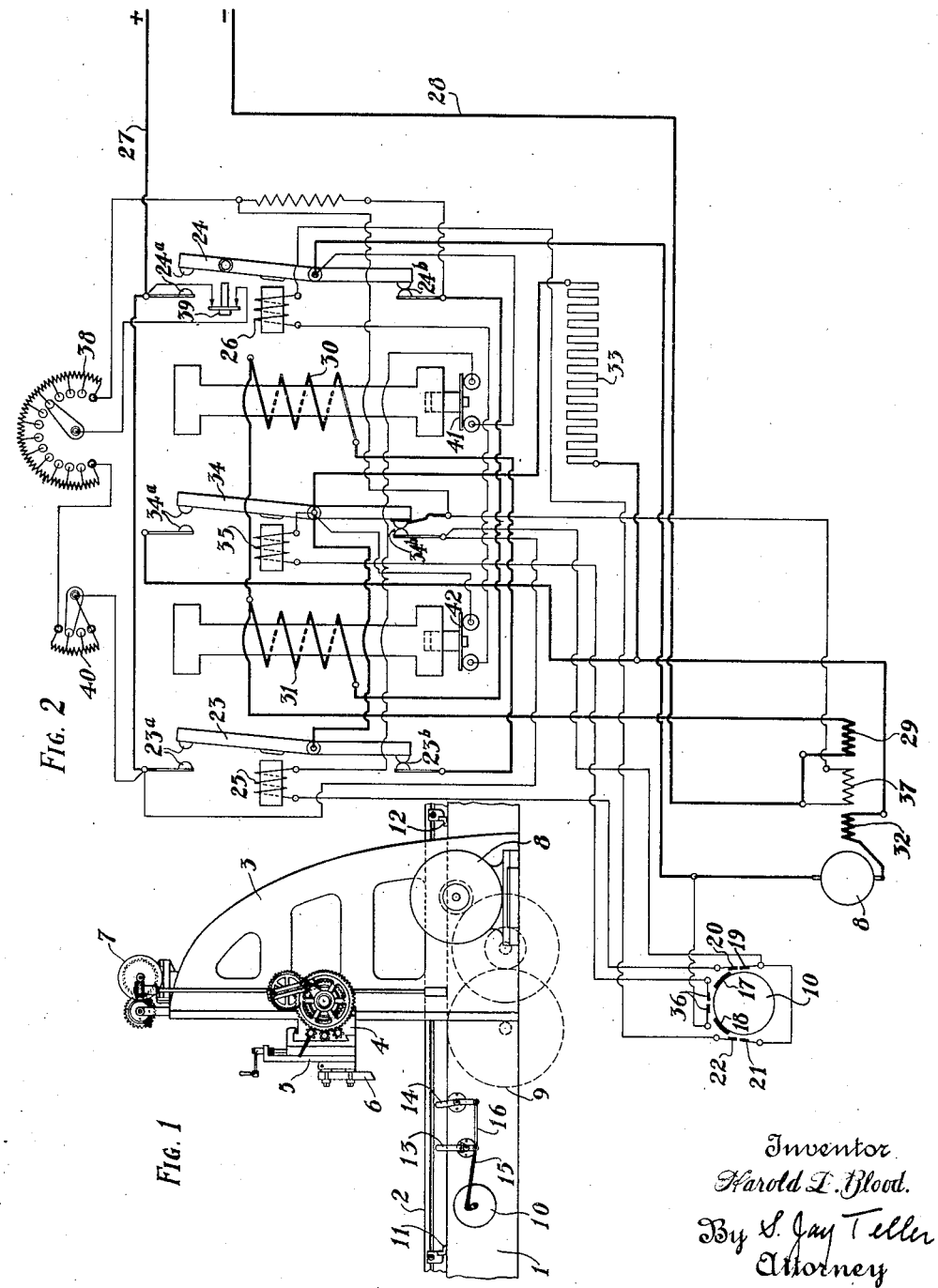
Inventor
Harold L. Blood.
By S. Jay Teller
Attorney June 12, 1923.

H. L. BLOOD 1,458,613

PLANER AND SYSTEM OF MOTOR CONTROL THEREFOR

Filed Jan. 31, 1920  4 Sheets-Sheet 2

Inventor
Harold L. Blood
By S. Jay Teller
Attorney

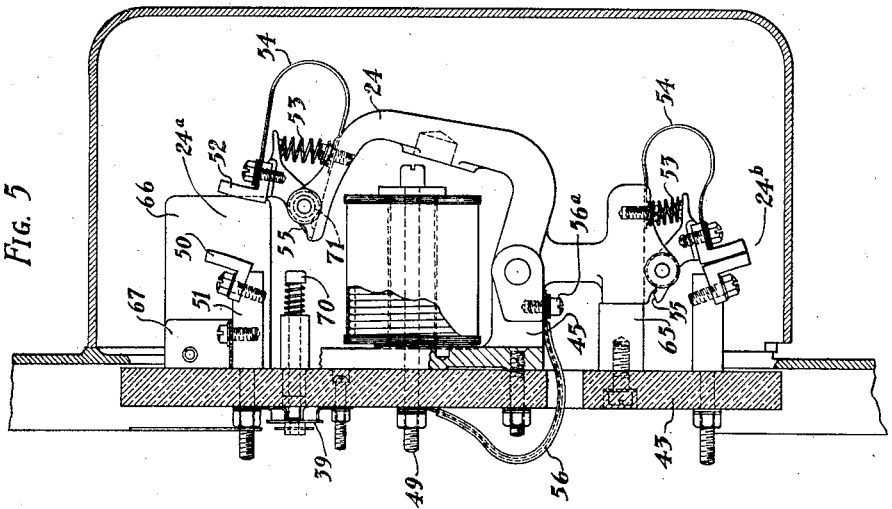
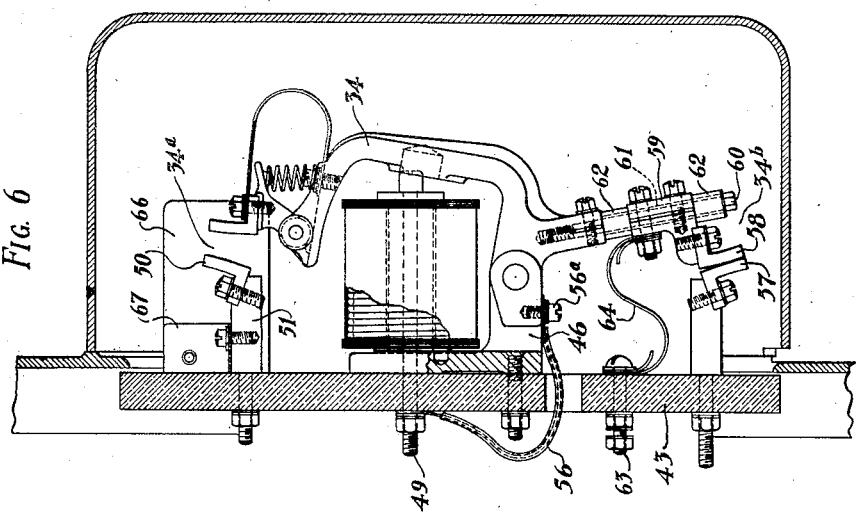

June 12, 1923.

H. L. BLOOD 1,458,613

PLANER AND SYSTEM OF MOTOR CONTROL THEREFOR

Filed Jan. 31, 1920 4 Sheets-Sheet 4

Inventor
Harold L. Blood.
By S. Jay Teller
Attorney

Patented June 12, 1923.

1,458,613

UNITED STATES PATENT OFFICE.

HAROLD L. BLOOD, OF PLAINFIELD, NEW JERSEY, ASSIGNOR TO NILES-BEMENT-POND COMPANY, OF NEW YORK, N. Y., A CORPORATION OF NEW JERSEY.

PLANER AND SYSTEM OF MOTOR CONTROL THEREFOR.

Application filed January 31, 1920. Serial No. 355,318.

*To all whom it may concern:*

Be it known that I, HAROLD L. BLOOD, a citizen of the United States, residing at Plainfield, in the county of Union and State of New Jersey, have invented certain new and useful Improvements in Planers and Systems of Motor Control Therefor, of which the following is a specification.

As concerns electrical connections, a mechanism embodying my invention is similar in many respects to that set forth in the patent to Samuel H. Keefer, No. 1,003,269, dated September 12th, 1911. The electrical connections also include certain features which are set forth in my copending application for planers and systems of motor control therefor, Serial No. 228,598, filed April 15, 1918.

One of the objects of the invention is to provide a planer and system of motor control therefor having improved means whereby the main starting switches are prevented from closing except under proper conditions. Another object of the invention is to provide a controller having improved mechanical features of construction whereby great simplicity is attained and whereby the parts can be more readily disassembled for inspection, repair or replacement. A further object of the invention is to provide an improved arrangement of parts whereby the same magnets serve to blow out the arcs at the switch contacts and also serve to move and hold the switch levers. Further objects of the invention will be apparent from the following specification and claims.

Of the accompanying drawings which illustrate the embodiment of the invention which I now prefer:

Figure 1 is a fragmentary side view of a planer embodying the invention.

Fig. 2 is a diagram of electrical connections, the view being taken at the rear of the switch panel.

Fig. 5 is a vertical sectional view of the controller taken along the line 5—5 of Fig. 3.

Fig. 6 is a vertical sectional view of the controller taken along the line 6—6 of Fig. 3.

Figure 3:
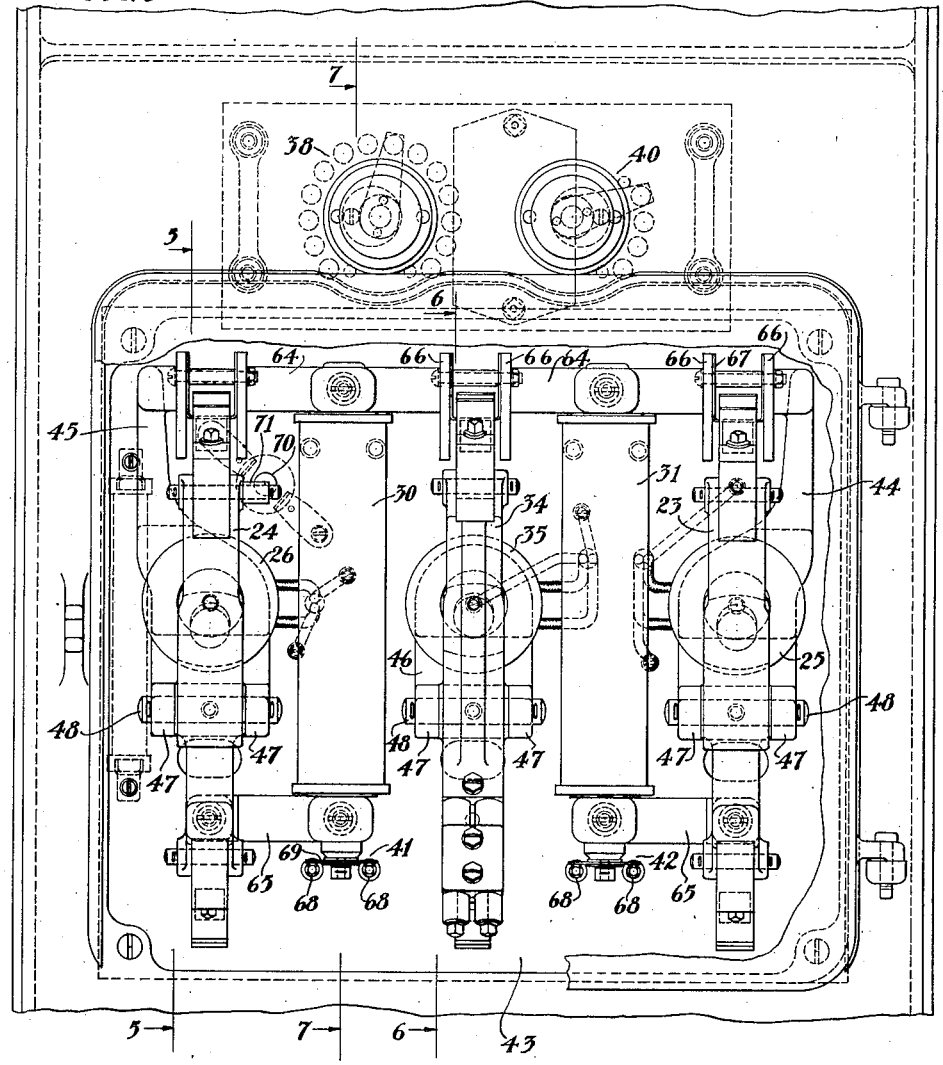
Fig. 3 is a front elevation of the main parts of the controller, the major portion of the cover being broken away to show the interior parts.

Referring to the drawing, 1 represents the bed of the planer and 2 the work-carrying table which is reciprocable longitudinally of the bed. At the sides of the bed and of the table are located uprights 3 of which one is shown in the drawing. Carried by the uprights and vertically adjustable thereon is a crossrail 4. Transversely adjustable along the crossrail are one or more crossheads 5 adapted to carry tools 6. For moving the crossrail vertically and for adjusting the crossheads there is provided a suitable mechanism which, as shown, includes a separate electric motor 7. The mechanical and electrical connections for the motor 7 constitute no part of the present invention and detailed description is unnecessary. As illustrated, these parts are similar to those shown in the Greenleaf and Keefer Patent No. 1,299,192 dated April 1st, 1919, to which patent reference can be had for detailed information.

For driving the reciprocating table 2 there is provided an electric motor 8 which is directly connected to the table by means of suitable spur gearing such as indicated at 9. For controlling the motor there is provided a pilot switch 10 secured to the planer bed and adapted to be operated by adjustable dogs 11 and 12 engaging levers 13 and 14. As shown, these levers are connected with the pilot switch by means of links 15 and 16. It will be seen that at the end of the movement of the table toward the right, that is, at the end of the cutting stroke, the dog 11 will engage the lever 13 and move the switch 10 in one direction; and at the end of the movement of the table toward the left, that is, in the return direction, the dog 12 will engage the lever 14 and move the switch 10 in the opposite direction.

Referring to the electrical diagram in Fig. 2, it will be seen that the pilot switch 10 is provided with contacts 17 and 18 adapted respectively to connect either the two contacts 19 and 20 or the two contacts 21 and 22.

There are provided two main double controlling switches 23 and 24 adapted to be operated respectively by electro-magnets 25 and 26, controlled by the switch 10. The switches 23 and 24 are provided respectively with upper pairs of contacts 23$^a$ and 24$^a$ and with lower pairs of contacts 23$^b$ and 24$^b$ so arranged that the contacts of one pair are separated whenever the contacts of the other pair are engaged. When the magnets are deenergized, the upper pairs of contacts are separated, as shown in the drawing.

The positive lead 27 is connected with the stationary contacts of the switches 23ª and 24ª and the negative lead 28 is connected with the stationary contacts of the switches 23ᵇ and 24ᵇ. This latter connection is not direct but extends through the series field 29 of the motor 8; and from the series field the circuit extends to the switch 23ᵇ through the coil of a blow-out magnet 30 adjacent the switches 24ª and 24ᵇ, and to the switch 24ᵇ through the coil of a blow-out magnet 31 adjacent the switches 23ª and 23ᵇ. The body part of the double switch 23 is connected with one side of the motor armature preferably through an interpole winding 32, and the circuit initially includes a starting resistance 33. The body part of the double switch 24 is connected directly with the other side of the motor armature.

When the pilot switch 10 is moved at the end of the return stroke into position for the cutting stroke, the contact 17 connects the contacts 19 and 20, thus partly establishing a circuit from the positive lead 27 through the contacts 19, 17 and 20 to the coil of the magnet 25. The circuit through the magnet is completed by other devices to be presently described. The energizing of the magnet causes the closing of the switch 23ª and the opening of the switch 23ᵇ. The closing of the switch 23ª establishes a circuit from the positive lead 27 through the switch 23ª, the starting resistance 33 and the interpole winding 32 to the armature. From the armature the circuit extends through the switch 24ᵇ, the coil of the blow-out magnet 31 and the series field 29 to the negative lead 28. The circuit being thus completed, the motor starts in the proper direction to drive the table 2 in the direction for cutting.

Preferably there is provided a third double controlling switch 34 provided at its upper end with contacts 34ª and at its lower end with contacts 34ᵇ, the movable contact of the lower switch being insulated from the switch body as indicated. The switch 34 is adapted to be operated by a magnet 35 which is connected in parallel with the motor armature. The circuit for the magnet 35 includes two contacts 36 on the pilot switch 10 adapted to be connected by one or the other of the contacts 17 and 18 when the switch 10 is in one or the other of its operative positions. With the switch 10 in the position described, the contacts 36 are connected by the contact 18 and the magnet 35 is then energized to operate the switch 34 when the counter electro-motive force of the motor 8 reaches a predetermined amount. This closes the switch 34ª and short-circuits the starting resistance 33.

The shunt field of the motor 8 is indicated at 37. This field is connected with the positive lead 27 through the switch 34ᵇ and is connected directly with the negative lead 28. When the magnet 35 acts, the switch 34ᵇ is opened thus interrupting the initial circuit of the shunt field and introducing into the said circuit an adjustable cutting resistance 38. When the switch 34ᵇ is open, the shunt field circuit extends from the positive lead 27 through a switch 39 and through more or less of the variable resistance 38. It will be seen that by varying this resistance 38 the speed of the motor for the cutting stroke of the planer may be varied.

At the end of the cutting stroke the contacts 19 and 20 of the pilot switch 10 are disconnected and the magnet 25 is de-energized, thus permitting the switch 23 to return to the position shown in the drawing. At the same time the contacts 36 are disconnected and the switch 34 is permitted to return to the position shown in the drawings. The switch 23ᵇ being closed, a dynamic braking circuit is established from the armature through the interpole winding 32, the resistance 33, the switch 23ᵇ, the magnet winding 30, the magnet winding 31 and the switch 24ᵇ back to the armature. The closing of this braking circuit brings the motor quickly to rest.

At the end of the cutting stroke, the switch 10 is moved not only to the position shown in the drawing, but is also moved to past this position so that the contact 18 connects the contacts 21 and 22 and the contact 17 connects the contacts 36. The connection of the contacts 21 and 22 partly establishes a circuit from the positive lead 27 through the switch contacts 21, 18 and 22 to the coil of the magnet 26. The circuit through the magnet is completed by other devices to be presently described. The magnet 26 causes the switch 24ª to close and the switch 24ᵇ to open. A circuit is then established from the positive lead 27 through the switch 24ª to the motor armature. From the motor armature the circuit extends through the interpole winding 32, the starting resistance 33, the switch 23ᵇ, the winding of the magnet 30 and the series field 29 back to the negative lead 28. This causes the motor to start in the opposite direction, that is, in the proper direction to drive the table in the the direction for return.

The starting resistance is automatically cut out as before described and resistance is introduced into the shunt field circuit. In order that this resistance may be greater for the return stroke thus giving increased speed the switch 39 is constructed so that it is automatically opened by a projection on the switch body 24. With the switch 39 open, the entire resistance 38 is placed in the circuit and also more or less of an additional return resistance 40. By varying this return resistance 40 the speed of the return stroke can be varied. At the end of the return stroke dynamic braking takes place as before described.

It will be noted that switches 41 and 42 are provided respectively at the lower ends of the blow-out magnets 30 and 31. Each of these switches is automatically held open so long as any considerable current flows through the coil of the corresponding magnet. It will be seen that the circuit for the magnet 25 extends through the switch 41 and thence through the switch 24$^b$ to the negative lead 28. Similarly, the circuit for the magnet 26 extends through the switch 42 and thence through the switch 23$^b$ to the negative lead 28. It will be seen that the switches 41 and 42 prevent the energization of either of the magnets 25 and 26 while any considerable current is flowing in the coils of the magnets 30 and 31. In view of the fact that the circuit for the magnet 25 extends through the switch 24$^b$ and that the circuit for the magnet 26 extends through the switch 23$^b$, it will be clear that neither of the magnets can be energized so long as the opposite switch is open.

It will furthermore be clear that neither of the magnets can be energized until the braking circuit is established. The connections for the magnets 25 and 26 are similar to those set forth in my aforesaid copending application, Serial No. 228,598, but in addition to the protection obtained by the connections I secure additional protection in my present invention by so arranging the blowout magnets 30 and 31 that they serve to quickly open the respective switches 23$^a$ and 24$^a$ and close the switches 23$^b$ and 24$^b$ and to so hold the said switches so long as any considerable current is flowing. The construction and arrangement of these combined blow-out and holding magnets will presently be described. Thus it is impossible for either of the switches 23$^a$ and 24$^a$ to be closed while the switches 41 and 42 are held open by the magnets 30 and 31. It is impossible for either of the switches 23$^a$ or 24$^a$ to be closed unless the opposite switch 24$^b$ or 23$^b$ is closed; and the switch 24$^b$ or the switch 23$^b$, as the case may be, is quickly closed and so held by the current flowing in coil of the adjacent magnet 30 or 31.

Figure 4:
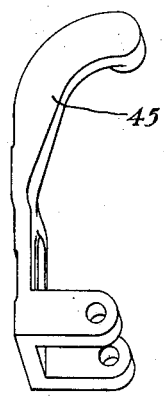
Fig. 4 is a perspective view of one of the supporting brackets.

Referring now to the mechanical construction of the controller, 43 is a panel of insulating material upon which the several switches and magnets are mounted. For supporting the two main switch members 23 and 24 there are brackets 44 and 45 which are similar except that they are oppositely formed. The bracket 45 is illustrated separately in Fig. 4. A third shorter bracket 46 is positioned between brackets 44 and 45 for supporting the switch body 34. Each of the brackets 44, 45 and 46 is provided with ears 47 through which extends a pivot pin 48 on which the corresponding switch lever 23, 24 or 34 is pivotally mounted. The magnets 25, 26 and 35 are preferably mounted respectively on the brackets 44, 45 and 46, being held in place by bolts 49 which extend through the panel 43.

The switches 23$^a$, 23$^b$, 24$^a$, 24$^b$ and 34$^a$ are all similar and a description of one of them will suffice. Referring to the switch 24$^a$ as shown in Fig. 5, it will be seen that this consists of a stationary contact 50 carried by a block 51 secured to the panel 43. Pivotally mounted on the body 24 is a contact 52 adapted to engage the contact 50. The contact 52 is forced outward by a spring 53 and is connected with the body 24 by means of a conductor 54. A stop 55 limits the outward movement of the contact 52. Connected to the switch levers 23, 24 and 34 are flexible conducting wires 56 which extend to the corresponding bolts 49 which may conveniently be used for electrical connection purposes. Each wire 56 is detachably connected with its lever by means of a screw 56$^a$. It will be seen that each switch lever is freely and independently detachable from the remainder of the controller to permit inspection or repair or the replacement of parts.

The switch 34$^b$ comprises a stationary contact 57 mounted similarly to the contacts 50. The movable contact 58 of this switch is insulated from the switch body 34. As shown the contact 58 is mounted on a block 59 carried by two studs 60 which extend into the switch body 34. Insulating bushings 61 are interposed between the block 59 and the studs 60. At opposite ends of the block 59 are insulating collars 62. The block 59 is connected with a suitable stud 63 on the panel 43 by means of a detachable flexible conductor.

Figure 7:
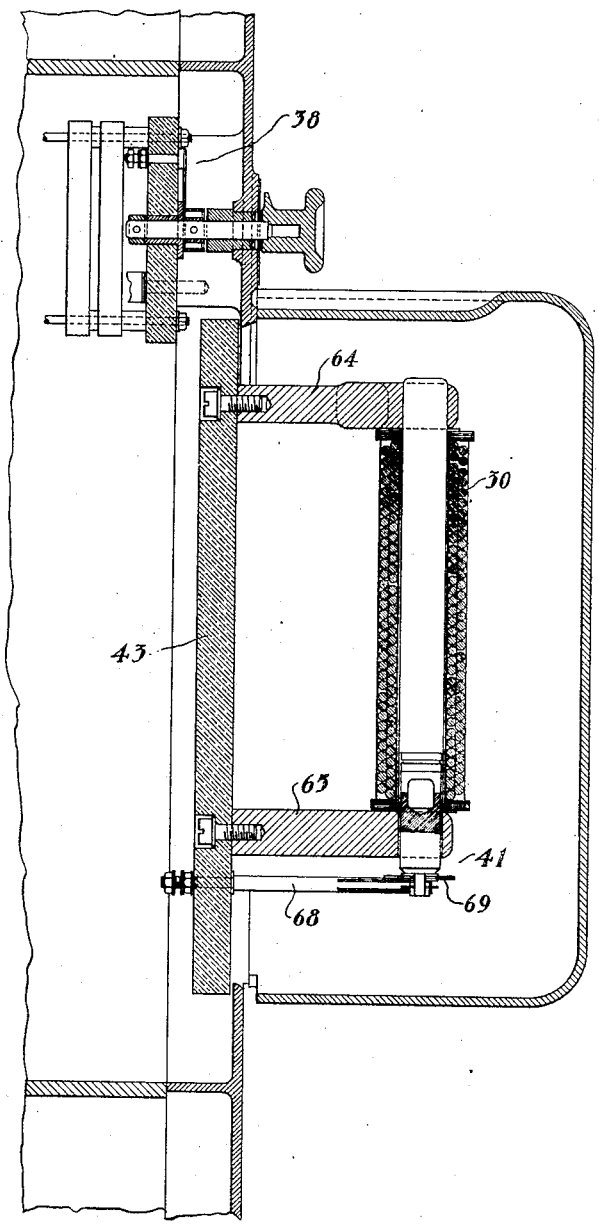
Fig. 7 is a vertical sectional view of the controller taken along the line 7—7 of Fig. 3.

The mountings for the two blow-out magnets 30 and 31 are similar, the mounting for the magnet 30 being shown in Fig. 7. The magnet is held between upper and lower brackets 64 and 65 which are secured to the panel 43. The lower bracket 65 is extended horizontally in the direction of the adjacent switch body and serves as a stop therefor as shown in Fig. 5. By referring again to the diagram of electrical connections in Fig. 2, it will be seen that when one of the switches 23$^a$ or 24$^a$ is closed the adjacent blow-out magnet is energized. The magnetic flux of the energized blow-out magnet extends through the support 65 and the magnet is thus enabled to assist in opening the corresponding upper switch and closing the corresponding lower switch when the corresponding magnet 25 or 26 is deenergized. Each of the upper brackets 64 is extended horizontally in both directions. Each of the brackets at its outer side cooperates with the corresponding bracket 44 or 45 to form a magnetic gap within which the corresponding switch 23ª or 24ª is located. At their inner ends, the brackets 64 cooperate to form a magnetic gap in which the switch 34ª is located. At each of the magnetic gaps there are located insulating plates 66—66 which are held in place and supported by a U-shaped clip 67 connected with the corresponding block 51.

Each of the switches 41 and 42 comprises two studs 68—68 secured to the panel 43. These studs are adapted to be connected by a cross bar 69 which is elevated out of contact with the studs when the magnet is energized. Positioned above the panel 43 are the two resistances 38 and 40 and the adjusting devices therefor. As the mechanical details of these parts do not of themselves constitute any part of invention, description thereof will be omitted. The switch 39 for short-circuiting parts of these resistances is shown in Fig. 5. This is adapted to be operated by a spring-pressed plunger 70 which is engaged by a projection 71 on the switch body 24 when it is moved to close the switch 24ª.

What I claim is:

1. A reciprocating table, a reversing electric table-driving motor, a table-operated pilot switch, and two main electromagnetic switches controlled by the pilot switch and each having two sets of contacts, the contacts of one set serving when the magnets are deenergized at the ends of the table movements to close a dynamic braking circuit and the contacts of the other set serving when the electromagnets are energized and the switches are moved to operative position to start the motor alternately in opposite directions, in combination with operating circuits for the switches each extending through contacts of the other switch and connected to prevent its own switch from being moved to the operative position when the other switch is in the operative position, and supplemental magnets adjacent the respective switches, each being energized upon closing of the corresponding switch and acting in opposition to the main operating magnet and serving upon the deenergization of the latter to quickly open the switch.

2. A reciprocating table, a reversing electric table-driving motor, a table-operated pilot switch, and two main electromagnetic switches controlled by the pilot switch and each having two sets of contacts, the contacts of one set serving when the magnets are deenergized at the ends of the table movements to close a dynamic braking circuit and the contacts of the other set serving when the electromagnets are energized and the switches are moved to the operative position to start the motor alternately in opposite directions, in combination with operating circuits for the switches each extending through contacts of the other switch and connected to prevent its own switch from being moved to the operative position when the other switch is in the operative position, supplemental magnets adjacent the respective switches, each being energized when the corresponding switch is closed and acting in opposition to the main operating magnet and serving upon the deenergization of the latter to quickly open the switch, and means in the operating circuits for the switches for preventing the closing of the said circuits while current flows in the said dynamic braking circuit.

3. A reciprocating table, a reversing electric table-driving motor, a table-operated pilot switch, and two main electromagnetic switches controlled by the pilot switch and each having two sets of contacts, the contacts of one set serving when the magnets are deenergized at the ends of the table movements to close a dynamic braking circuit and the contacts of the other set serving when the electromagnets are energized to start the motor alternately in opposite directions, in combination with operating circuits for the switches each connected to remain open until the dynamic braking circuit of the motor is completed, and supplemental magnets adjacent the respective switches, each being energized when the corresponding switch is closed and acting in opposition to the main operating magnet and serving upon the deenergization of the latter to quickly open the switch.

4. A reciprocating table, a reversing electric table-driving motor, a table-operated pilot switch, and two main electromagnetic switches controlled by the pilot switch and each having two sets of contacts, the contacts of one set serving when the magnets are deenergized at the ends of the table movements to close a dynamic braking circuit and the contacts of the other set serving when the electromagnets are energized to start the motor alternately in opposite directions, in combination with operating circuits for the switches each connected to remain open until the dynamic braking circuit of the motor is completed, supplemental magnets adjacent the respective switches, each being energized when the corresponding switch is closed and acting in opposition to the main operating magnet and serving upon the deenergization of the latter to quickly open the switch, and means in the operating circuits for the switches for preventing the closing of the said circuits while current flows in the said dynamic braking circuit.

5. In a control system, the combination comprising a motor, two switches having circuit connections thereto for governing the operation of said motor, two main electro-magnets for operating said switches, and a supplemental electro-magnet mounted adjacent to each of said main magnets, said supplemental magnets being so disposed with respect to the associated switches as not only to blow out the arcs formed by the main switches but also to return them to the released position upon de-energization of the main magnets.

6. In a control system, the combination comprising a motor, two main electro-magnetic switches having circuit connections thereto for operating the motor in a forward and in a reverse direction and for completing a dynamic-braking circuit, and a supplemental magnet associated with each main switch and energized upon operation of the associated main switch, each of said supplemental magnets serving to exert a force tending to move the associated main switch to released position.

7. In a control system, the combination comprising a motor, two main electro-magnetic switches having circuit connections thereto for operating said motor in a forward and in a reversed direction and for completing a dynamic-braking circuit, and a supplemental magnet associated with each switch for biasing the switches to released position and for preventing movement of either switch to an operative position when a dynamic-braking current is flowing each of said supplemental magnets being energized not only when the associated main switch is operated but also when a dynamic braking current is flowing.

8. In a control system, the combination comprising a motor, two electro-magnetic switches having circuit connections thereto for operating the motor in a forward and a reverse direction and for completing a dynamic-braking circuit and means comprising a supplemental magnet associated with each switch for biasing the switches to a released position for preventing movement of either switch to operative position when a dynamic-braking current is flowing and for blowing out the arcs formed by the main switches.

9. In a control system, the combination comprising a motor, two switches having circuit connections thereto for operating said motor in a forward and in a reverse direction and for completing a dynamic-braking circuit, two main electro-magnets for operating said switches, and a supplemental magnet located adjacent to each of said switches, each of said supplemental magnets being energized upon operation of the corresponding main magnet and acting in opposition to the main magnets to quickly move said switches to the released position upon deenergization of the main magnets.

10. In a control system, the combination comprising a motor, two switches having circuit connections thereto for operating the motor in a forward and in a reverse direction and for completing a dynamic-braking circuit, two main electro-magnets for operating said switches, and a supplemental magnet located adjacent to each of said switches, said supplemental magnets acting in opposition to the main magnets and serving not only to quickly move said switches to released position upon deenergization of the main magnets but also to blow out the arcs formed by the main switches.

11. In a control system, the combination comprising a motor, two switches having circuit connections thereto for operating the motor in a forward and in a reverse direction and for completing a dynamic-braking circuit, two main electro-magnets for operating said switches, a supplemental magnet located adjacent to each of said switches, each of said supplemental magnets being energized upon operation of the corresponding main magnet and acting in opposition to the main magnets to quickly move said switches to released position upon de-energization of the main magnets, and means for preventing the simultaneously operating of said main electro-magnets.

12. In a control system, the combination comprising a motor, two switches having circuit connections thereto for governing the operation of said motor, two main electro-magnets for operating said switches, a supplemental electro-magnet mounted adjacent to each of said main magnets, said supplemental magnets being so disposed with respect to the associated switches as not only to blow out the arcs formed by the switches but also to return the switches to released position upon deenergization of the main electro-magnets, and means for preventing the simultaneous operating of said main electro-magnets.

13. In a control system, the combination comprising a motor, two main electro-magnetic switches having circuit connections thereto for operating the motor in a forward and in a reversed direction and for completing a dynamic-braking circuit, a supplemental magnet associated with each switch for biasing the main switches to released position and two supplemental switches respectively operated by said supplemental magnets for preventing simultaneous operation of the two main switches and for preventing movement of either main switch to an operative position when a dynamic-braking current is flowing.

14. In a control system, the combination comprising a motor, two switches having circuit connections thereto for operating the motor in a forward and in a reverse direction and for completing a dynamic-braking circuit, two main electro-magnets for operating said switches, a supplemental magnet located adjacent to each of said switches, said supplemental magnets acting in opposition to the main magnets and serving to quickly move said switches to released position upon de-energization of the main magnets, means for preventing the simultaneously operating of said main electro-magnets, and means comprising two switches operated by said supplemental magnets and respectively included in the energizing circuits of the main electro-magnets for preventing the operation of either main electro-magnet when a dynamic-braking current is flowing.

15. In a control system, the combination comprising a motor, two switches having circuit connections thereto for operating the motor in a forward and in a reverse direction and for completing a dynamic-braking circuit, two main electro-magnets for operating said switches, a supplemental magnet located adjacent to each of said switches, said supplemental magnets acting in opposition to the main magnets and serving not only to quickly move said switches to released position upon deenergization of the main magnets but also to blow out the arcs formed by the main switches, means for preventing simultaneous operation of said main electro-magnets, and means operated by said supplemental magnets for preventing operation of either main electro-magnet when a dynamic-braking current is flowing.

In testimony whereof, I hereto affix my signature.

HAROLD L. BLOOD.